United States Patent Office 3,295,940
Patented Jan. 3, 1967

---

3,295,940
ABRASIVE RESINOUS POLYMER COMPOSITIONS
AND THEIR PREPARATION
Clare W. Gerow, Wilmington, Del., assignor to E. I. du
Pont de Nemours and Company, Wilmington, Del., a
corporation of Delaware
No Drawing. Filed Dec. 19, 1962, Ser. No. 245,665
14 Claims. (Cl. 51—298)

This invention relates to a new abrasive resinous material and a process for making it.

In the prior art, resinous compositions have been made abrasive by physically mixing the resin with abrasive particles. However, to provide effective mixing usually requires the use of the resin in the molten state or the use of a plasticizer for the resin. Obtaining some resins in the molten state is almost impossible since the resins tend to degrade before or during melting. Using a plasticizer adds the expense of the plasticizer and the expense of the step in which the plasticizer is removed.

Furthermore, in the preparation of mixtures of polyimide resins with abrasive particles, the use of heat or the use of a plasticizer is not easily possible. The greatest advantage of polyimide resins stems from their resistance to heat and their resistance to chemicals. In other words, the same outstanding physical and chemical properties that would make these particle-containing polymers extremely useful in the form of shaped abrasive articles such as films, filaments, tubing, etc., make it extremely difficult to obtain these articles in the first instance.

The object of the present invention is to form particle-containing polyimide shaped articles. Other objects will appear hereinafter.

The objects are accomplished by first forming a composition containing at least one polyamide-acid having an inherent viscosity of at least 0.1, preferably 0.3–5.0, having blended therein inert, crystalline, abrasive particles, e.g., green rouge, silica, alumina, boron carbide, silicon carbide, steel and diamond particles; then shaping the particle-containing polyamide-acid composition into a structure; and, thereafter, converting the structure to a polyimide structure containing the particles.

The process may be divided into four steps:
(1) Preparing the polyamide-acid.
(2) Preparing a composition of the particle/polyamide-acid mixture.
(3) Shaping the composition into a useful structure.
(4) Converting the structure to a particle-containing polyimide structure.

Each of these steps will be discussed separately in subsequent portions of this specification.

Preparing polyamide-acid compositions

The process for preparing the polyamide-acid composition involves reacting at least one organic diamine having the structural formula

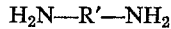

wherein R' is a divalent radical containing at least 2 carbon atoms, the two amino groups of said diamine each attached to separate carbon atoms of said divalent radical; with at least one tetracarboxylic acid dianhydride having the structural formula

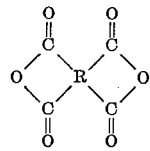

wherein R is a tetravalent radical containing at least 2 carbon atoms, no more than 2 carbonyl groups of said dianhydride attached to any one carbon atom of said tetravalent radical; in an organic solvent for at least one of the reactants, the solvent being inert to the reactants, preferably under anhydrous conditions, for a time and at a temperature sufficient to provide a shapeable composition of polyamide-acid.

It should be understood that it is not necessary that the polymeric component of the composition be composed entirely of the polyamide-acid. This is particularly true since conversion to the polyimide is contemplated subsequent to shaping the composition. To retain its shapeability, it has been found that in most instances the polymeric component of the composition should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid conducting the reaction below 100° C. However, temperatures up to 175° C. may be tolerated to provide shapeable compositions. The particular temperature below 175° C. that must not be exceeded for any particular combination of diamine, dianhydride, solvent, and reaction time to provide a reaction product composed of sufficient polyamide-acid to be shapeable will vary but can be determined by a simple test by any person of ordinary skill in the art. However, to obtain the maximum inherent viscosity, i.e. maximum degree of polymerization, for any particular combination of diamine, dianhydride, solvent, etc., and thus produce shaped articles such as films and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of of one reactant to limit the molecular weight of the polyamide-acid, a chain terminating agent such as phthalic anhydride may be used to "cap" the ends of the polymer chains.

In the preparation of the polyamide-acid intermediate, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g. N,N-dimethylacetamide. To calculate inherent viscosity, the viscosity of the polymer solution is measured relative to that of the solvent alone.

Inherent viscosity =

$$\frac{\text{natural logarithm } \frac{\text{Viscosity of solution}}{\text{Viscosity of solvent}}}{C}$$

where C is the concentration expressed in grams of polymer per 100 milliliters of solution. As known in the polymer art, inherent viscosity directly related to the molecular weight of the polymer.

The quantity of organic solvent used in the process need only be sufficient to dissolve enough of one reactant, preferably the diamine, to initiate the reaction of the diamine and the dianhydride. For forming the composition into shaped articles, it has been found that the most successful results are obtained when the solvent represents at least 60% of the final polymeric solution. That is, the solution should contain 0.05-40% of the polymeric component. The viscous solution of the polymeric composition containing polyamide-acid in the polymeric component dissolved in the solvent may be used as such for forming shaped structures.

The starting materials for forming the products of the present invention are organic diamines and tetracarboxylic acid dianhydrides. The organic diamines are characterized by the formula: $H_2N—R'—NH_2$, wherein $R'$, the divalent radical, may be selected from the following groups: aromatic, aliphatic, cycloaliphatic, combination of aromatic and aliphatic, heterocyclic, bridged organic radicals wherein the bridge is oxygen, nitrogen, sulfur, silicon or phosphorus, and substituted groups thereof. The preferred $R'$ groups in the diamines are those containing at least 6 carbon atoms characterized by benzenoid unsaturation. Such $R'$ groups include

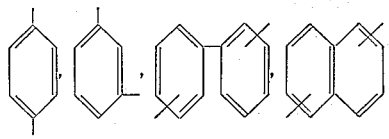

and

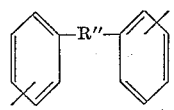

wherein $R''$ is selected from the group consisting of carbon in an alkylene chain having 1–3 carbon atoms, —O—, silicon in

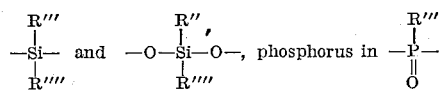

and

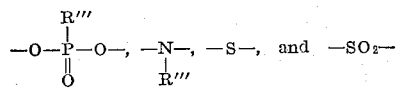

wherein $R'''$ and $R''''$ are alkyl or aryl. Among the diamines which are suitable for use in the present invention are: metaphenylene diamine; para-phenylene diamine; 4,4'-diaminodiphenyl propane; 4,4'-diamino-diphenyl methane; benzidine; 4,4'-diamino-diphenyl sulfide, 4,4'-diamino-diphenyl sulfone; 3,3'-diamino-diphenyl sulfone; 4,4'-diamino-diphenyl ether; 2,6-diamino-pyridine; bis-(4-amino-phenyl)diethyl silane; bis-(4-amino-phenyl) diphenyl silane; bis-(4-amino-phenyl)-N-methylamine; 1,5-diamino naphthalene; 3,3'-dimethyl-4,4'-diamino-biphenyl; 3,3'-dimethoxy benzidine 2,4-bis(beta-amino-t-butyl)toluene; bis-(para - beta - amino-t-butyl-phenyl) ether; para-bis (2-methyl-4-amino-pentyl) benzene; para-bis-(1,1-dimethyl-5-amino-pentyl)benzene; m-xylylene diamine; p-xylylene diamine; bis(para-amino-cyclohexyl) methane; hexamethylene diamine; heptamethylene diamine; octamethylene diamine; nonamethylene diamine; decamethylene diamine; 3-methylheptamethylene diamine; 4,4 - dimethylheptamethylene diamine; 2,11 - diamino-dodecane; 1,2-bis-(3-amino-propoxy) ethane; 2,2-dimethyl propylene diamine; 3-methoxy-hexamethylene diamine; 2,5 - dimethylhexamethylene diamine; 2,5-dimethylheptamethylene diamine; 5-methylnonamethylene diamine; 1 4-diamino-cyclohexane; 1,12-diamino-octadecane; 2,5 - diamino-1,3,4-oxadiazole;

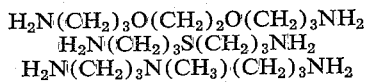

3,3'-dichlorobenzidine; bis-(4-amino-phenyl) ethyl phosphine oxide; bis-(4-amino-phenyl) phenyl phosphine oxide; bis-(4-amino-phenyl)-N-phenylamine; and mixtures thereof.

The tetracarboxylic acid dianhydrides are characterized by the following formula:

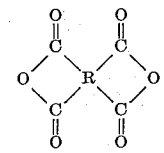

wherein R is a tetravalent organic radical selected from the group consisting of aromatic, aliphatic, cycloaliphatic, heterocyclic, combination of aromatic and aliphatic, and substituted groups thereof. However, the preferred dianhydrides are the aromatic tetracarboxylic acid dianhydrides, those in which the R groups have at least one ring of 6 carbon atoms characterized by benzenoid unsaturation (alternate double bonds in a ring structure), and particularly those aromatic dianhydrides wherein the 4 carbonyl groups of the dianhydride are each attached to separate carbon atoms in a benzene ring and wherein the carbon atoms of each pair of carbonyl groups is directly attached to adjacent carbon atoms in a benzene ring of the R group to provide a 5-membered ring as follows:

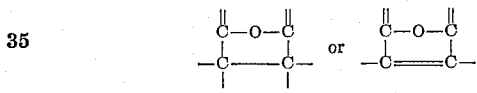

Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl)propane dianhydride; bis (3,4-dicarboxyphenyl) sulfone dianhydride; 3,4,9,10-perylene tetracarboxylic dianhydride; bis(3,4-dicarboxyphenyl) ether dianhydride; ethylene tetracarboxylic dianhydride; naphthalene-1,2,4,5-tetracarboxylic dianhydride; naphthalene-1,4,5,8-tetracarboxylic dianhydride; decahydronaphthalene - 1,4,5,8 - tetracarboxylic dianhydride; 4,8-dimethyl-1,2,3,5,6,7-hexahydronaphthalene-1,2,5,6-tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; phenanthrene-1,8,9,10-tetracarboxylic dianhydride; cyclopentane-1,2,3,4-tetracarboxylic dianhydride; pyrrolidine-2,3,4,5-tetracarboxylic dianhydride; pyrazine-2,3,5,6-tetracarboxylic dianhydride; 2,2-bis(2,3-dicarboxyphenyl) propane dianhydride; 1,1-bis(2,3-dicarboxyphenyl) ethane dianhydride; 1,1-bis(3,4-dicarboxyphenyl) ethane dianhydride; bis(2,3-dicarboxyphenyl) methane dianhydride; bis(3,4-dicarboxyphenyl) methane dianhydride; bis(3,4-dicarboxyphenyl) sulfone dianhydride; benzene-1,2,3,4-tetracarboxylic dianhydride; 1,2,3,4-butane tetracarboxylic dianhydride; thiophene-2,3,4,5-tetracarboxylic dianhydride; 3,4,3',4'-benzophenone tetracarboxylic dianhydride; etc.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or diffusion. Other typical compounds of this useful class of solvents are: N,N-diethylformamide, N,N-diethylacetamide, N,N-dimethylmethoxy acetamide, N-methylcaprolactam, etc. Other solvents which may be used in the present invention are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents, or in combination with poor solvents such as benzene, benzonitrile, dioxane, xylene, toluene and cyclohexane.

*Preparing a composition of the particle/polyamide-acid mixture*

The particles may be added at any stage in the preparation of the polyamide-acid. The particles may be added to the organic solvent prior even to the introduction of the diamine and the dianhydride. They also may be added to the solution in the organic solvent of one or both of the reactants before, during or after the formation of the polyamide-acid. Preferably, the particles are added to a solution of the polyamide-acid.

The particles may represent anywhere from 5% to 90%, preferably 5–75%, by weight, of the blend of particles and polymer. The use of less than 5% does not provide adequate abrasiveness. The use of amounts greater than 90%, and with some polyimides greater than 75%, tends to weaken the product and does limit its usefulness as a self-supporting structure.

The most useful particles for use in the present invention are green rouge, silica, alumina, boron carbide, silicon carbide, steel and diamond. The most common forms of abrasive silica and alumina are sand and corundum, respectively. Also operable are emory (an impure form of corundum), "Aloxite" and Alundum (alumina), "Crystolon" and "Carbolon" (silicon carbide). The sharper, harder particles, especially when used in the larger amounts, impart the higher cutting rates (as would be expected). The size of the particles also affects the abrasiveness of the product, and is chosen accordingly. Useful structures having average abrasive contents in the lower end of the range, and possibly below 5%, result from filling a polyamide-acid to a very high abrasive content, and using this filled material as a coating on an unfilled polyimide structure, or on one containing another filler for a different purpose, or on any other material in sheet or bulk form.

*Shaping the composition into a useful structure*

The polyamide-acid composition containing the particles dispersed therein so that the total solids represent anywhere from 5% to 90% of the solution is next shaped into a useful article. Shaping may be accomplished by extruding the solution through an appropriate orifice or slot to form filaments, rods, flat sheets, tubing or the like. Alternatively, the composition may be cast onto flat or curved surfaces to form sheets, films, etc., or placed in molds of the desirable shape. The composition may also be coated on to insulating substrates, preferably surface-modified polyimide films.

*Converting the structure or article to a particle-containing polyimide article*

The shaped articles composed of a substantial amount of the polyamide-acid and the particles are converted to the respective abrasive polyimide shaped articles by any one or more of several processes. One process comprises converting the polyamide-acid units of the following structural formula:

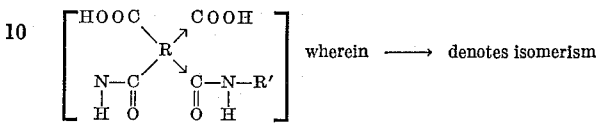

to polyimide by heating above 50° C. Heating serves to convert pairs of amide and carboxylic acid groups to imide groups. Heating may be conducted for a period of a few seconds to several hours. It has been found that after the polyamide-acid has been converted to the polyimide in accordance with the above described heat conversion, if the polyimide is further heated to a temperature of 300°–500° C. for a short interval (15 seconds to 2 minutes), improvements in the thermal and hydrolytic stabilities of the polyimide structure are obtained as well as an increase in inherent viscosity.

A second process for converting polyamide-acid to the corresponding polyimide is a chemical treatment and involves treating the polyamide-acid composition with a dehydrating agent alone or in combination with a tertiary amine, e.g. acetic anhydride or an acetic anhydride-pyridine mixture. The polyamide-acid shaped article can be treated in a bath containing the acetic anhydride-pyridine mixture. The ratio of acetic anhydride to pyridine may vary from just above zero to infinite mixtures. It is believed that the pyridine functions as a catalyst for the action of the cyclyzing agent, the acetic anhydride. The amine functions as a catalyst for the action of the cyclyzing agent, the anhydride.

Besides acetic anhydride, lower fatty acid anhydrides and aromatic monobasic acid anhydrides can be used. The lower fatty acid anhydrides include propionic, butyric, valeric, mixed anhydrides of these with one another and with anhydrides of aromatic monocarboxylic acids, e.g. benzoic acid, naphthoic acid, etc., and with anhydrides of carbonic and formic acids, as well as aliphatic ketenes (ketene and dimethyl ketene). The preferred fatty acid anhydrides are acetic anhydrides and ketene. Ketenes are regarded as anhydrides of carboxylic acids (ref. Bernthesen-Sudborough, textbook of Organic Chemistry, Van Nostrand 1935, page 861 and Hackh's Chemical Dictionary, Blakiston 1953, page 468) derived from drastic dehydration of the acids.

The aromatic monobasic acid anhydrides include the anhydride of benzoic acid and those of the following acids: o-, m- and p-toluic acids; m- and p-ethyl benzoic acids; p-propyl benzoic acid; p-isopropyl benzoic acid; anisic acid; o-, m- and p-nitro benzoic acids; o-, m- and p-halo benzoic acids; the various dibromo and dichloro benzoic acids; the tribromo and trichloro benzoic acids; isomeric dimethyl benzoic acids, e.g. hemellitic, 3,4-xylic, isoxylic and mesitylenic acids; veratric acid; trimethoxy benzoic acid; alpha- and beta-naphthoic acids; and biphenyl-carboxylic (i.e. p-phenyl benzoic) acid; mixed anhydrides of the foregoing with one another and with anhydrides of aliphatic monocarboxylic acids, e.g. acetic acid, propionic acid, etc., and with anhydrides of carbonic and formic acids.

Tertiary amines having approximately the same activity as the preferred pyridine may be used in the process. These include isoquinoline, 3,4-lutidine, 3,5-lutidine, 4-methyl pyridine, 3-methyl pyridine, 4-isopropyl pyridine, N-dimethyl benzyl amine, 4-benzyl pyridine, and N-dimethyl dodecyl amine. These amines are generally used from 0.3 to equimolar amounts with that of the anhydride converting agent. Trimethyl amine and triethylene diamines are much more reactive, and therefore are generally used in still smaller amounts. On the other hand, the following operable amines are less reactive than pyridine: 2-ethyl pyridine, 2-methyl pyridine, triethyl amine, N-ethyl morpholine, N-methyl morpholine, diethyl cyclohexylamine, N-dimethyl cyclohexylamine, 4-benzoyl pyridine, 2,4-lutidine, 2,6-lutidine and 2,4,6-collidine, and are generally used in larger amounts.

made from equimolar amounts of pyromellitic dianhydride and bis(4-aminophenyl) ether. Each mixture was doctored onto a moving "Mylar"[1] polyester film belt below the surface of a 1/1 by volume mixture of acetic anhydride and pyridine. As the filled polyimide film gelled, it was wound up with the belt in the bath. Each roll was soaked in benzene and then dried on a belt dryer under radiant heaters.

| Example | Particle Size (grit) | Percent Filler | Modulus (K p.s.i.) | | Elongation (percent) | | Tensile Strength (K p.s.i.) | | Tear Strength (g./mil) | Zero Strength Temperature (° C.) |
|---|---|---|---|---|---|---|---|---|---|---|
| | | | 23° C. | 200° C. | 23° C. | 200° C. | 23° C. | 200° C. | | |
| 1 | 600 | 20 | 260 | 210 | 55 | 65 | 12.3 | 6.7 | 11 | 870 |
| 2 | 400 | 20 | 235 | 185 | 40 | 35 | 10.8 | 5.7 | 13 | 860 |
| 3 | 320 | 20 | 194 | 145 | 29 | 30 | 8.8 | 4.8 | 10 | 855 |
| 4 | 240 | 20 | 165 | 100 | 22 | 20 | 6.8 | 3.6 | 9 | 845 |
| 5 | 120 | 40 | 90 | 60 | 20 | 20 | 3.7 | 2.2 | 8 | 840 |
| Control | | 0 | 415 | 260 | 20–140 | 30–160 | 16.5 | 13.0 | 3–23 | 815 |

As a third process of conversion, a combination treatment may be used. The polyamide-acid may be partially converted to the polyimide in a chemical conversion treatment and then cyclization to the polyimide may be completed by subsequent heat treatment. The conversion of the polyamide-acid to the polyimide in the first step can be limited if it is desired to shape the composition at this stage. After shaping, the completion of the cyclization of the polyimide/polyamide-acid may be accomplished.

The presence of polyimide is evidenced by its insolubility in cold basic reagents as opposed to the rapid solubility of polyamide-acid. Its presence is also apparent if the polyamide-acids are scanned with infrared during conversion to the polyimide. The spectra initially show a predominating absorption band at ca. 3.1 microns due to the NH bond. This band gradually disappears and as the reaction progresses, the polyimide absorption bands appear, a doublet at ca. 5.64 and 5.89 microns and a peak at 13.85 microns. When conversion is completed, the characteristic polyimide band predominates.

The products fill an important need because of their combination of abrasiveness and remarkable thermal stability, coupled with other important film properties such as high modulus and tensile strength. Therefore, these compositions are useful wherever abrasive cloths, belts or discs are used, and particularly for high speed belts and discs which must stand high temperatures. They can be fastened to the cutting surfaces of abrasive wheels.

The attainment of heat resistance in abrasive wheels has been suggested in the recent literature as an objective for research. These new abrasive materials are similar in their durability to heat to those having metallic bonds. They are more flexible than structures having silicate or vitrified bonds, and tougher than those bonded by shellac or rubber. They fill an important need.

Polyimides filled with diamond dust are especially useful for dressing the surfaces of many grinding wheels, and for shaping and sharpening cemented carbide tools. Those filled with silicon carbide are effective on relatively soft as well as hard, brittle materials—e.g. glass, granite, chilled iron and cemented carbides.

Some of the tough abrasive compositions which do not have high cutting qualities are useful, nevertheless, as clutch facings, brake linings and bearing materials.

The invention will be more clearly understood by referring to the examples which follow. These examples, which illustrate specific embodiments of the present invention, should not be construed to limit the invention in any way.

*Examples 1–5*

Silicon carbide of various particle sizes was mixed into solutions in N,N-dimethylacetamide of a polyamide-acid Although the polyimide had been softened and weakened considerably by the filler, the filled films were still sufficiently stiff and strong for their intended purpose. Each of the products, in the form of a disk, grinds and/or polishes very hard steel. They are effective even at high rates and under such pressures that sufficient heat is generated to melt or decompose any other known organic plastic. These disks vary in their utility, those containing the coarser particles being primarily effective for cutting by abrasive removal of large amounts of steel, and the finer ones being primarily polishers.

*Examples 6–9*

Abrasive films useful for the same high temperature, rapid, heavy duty grinding operations are prepared by substituting the indicated amount of each of the following abrasives for silicon carbide in the procedure of Examples 1–5:

| Example | Filler | Amount (percent) |
|---|---|---|
| 6 | Diamond dust | 5 |
| 7 | "Crystolon" silicon carbide | 75 |
| 8 | "Carbolon" silicon carbide | 20 |
| 9 | Boron carbide | 20 |

*Examples 10–19*

Substitution of each of the following abrasives for silicon carbide in the procedure of Examples 1–5 gives abrasive films which grind moderately hard materials at high speeds and at very high temperatures:

| Example | Filler | Amount (percent) |
|---|---|---|
| 10 | Sand—very fine | 25 |
| 11 | Sand—medium | 25 |
| 12 | Sand—coarse | 15 |
| 13 | Corundum | 20 |
| 14 | Emory | 90 |
| 15 | "Aloxite" alumina | 20 |
| 16 | Alundum | 20 |
| 17 | Steel grit (finer than 90) | 20 |
| 18 | Garnet crystals | 20 |
| 19 | Green rouge ($Cr_2O_3$) | 10 |

The product of Example 19 imparts especially high lusters to platinum and stainless steels when used in high speed polishing operations on these materials.

Having fully disclosed the invention, what is claimed is:

1. A process which comprises mixing at least one diamine with at least one tetracarboxylic acid dianhydride in a solvent for at least one of said diamine and said dianhydride for a time and at a temperature sufficient to form a polyamide-acid, said temperature not exceeding 175° C.; adding from 5% to 90% by weight of crystalline, abrasive particles selected from the group consisting

[1] Du Pont registered trademark.

of green rouge, silica, alumina, boron carbide, silicon carbide, steel and diamond to form a shapeable polymeric composition having said particles dispersed uniformly therein; shaping said composition into a shaped article; and converting the polymer in said polymeric composition to polyimide.

2. A process as in claim 1 wherein said diamine is 4,4'-diamino-diphenyl ether.

3. A process as in claim 1 wherein said dianhydride is pyromellitic dianhydride.

4. A process as in claim 1 wherein said solvent is dimethylacetamide.

5. A process which comprises mixing at least one diamine with at least one tetracarboxylic acid dianhydride in a solvent for at least one of said diamine and said dianhydride for a time and at a temperature sufficient to form a polyamide-acid, said temperature not exceeding 175° C.; adding from 5% to 90% by weight of crystalline, abrasive particles selected from the group consisting of green rouge, silica, alumina, boron carbide, silicon carbide, steel and diamond to form a shapeable polymeric composition having said particles dispersed uniformly therein; shaping said composition into a shaped article; and heating said article at a temperature above 50° C. for a time sufficient to convert the polymer in said article to polyimide.

6. A process which comprises mixing at least one diamine with at least one tetracarboxylic acid dianhydride in a solvent for at least one of said diamine and said dianhydride for a time and at a temperature sufficient to form a polyamide-acid, said temperature not exceeding 175° C. adding from 5% to 90% by weight of crystalline, abrasive particles selected from the group consisting of green rouge, silica, alumina, boron carbide, silicon carbide, steel and diamond to form a shapeable polymeric composition having said particles dispersed uniformly therein; shaping said composition into a shaped article; and treating said composition with an anhydride selected from the group consisting of lower fatty acid anhydrides and aromatic monobasic acid anhydrides to convert the polymer in said article to polyimide.

7. A process which comprises mixing at least one diamine with at least one tetracarboxylic acid dianhydride in a solvent for at least one of said diamine and said dianhydride for a time and at a temperature sufficient to form a polyamide-acid, said temperature not exceeding 175° C.; adding from 5% to 90% by weight of crystalline, abrasive particles selected from the group consisting of green rouge, silica, alumina, boron carbide, silicon carbide, steel and diamond to form a shapeable polymeric composition having said particles dispersed uniformly therein; shaping said composition into a shaped article; and treating said article with a mixture of acetic anhydride and pyridine to convert the polymer in said article to polyimide.

8. An abrasive resinous material consisting essentially of polyamide-acid having from 5% to 90% by weight of crystalline particles selected from the group consisting of green rouge, silica, alumina, boron carbide, silicon carbide, steel and diamond distributed through the material.

9. An abrasive film consisting essentially of a polyamide-acid film having from 5% to 90% by weight of crystalline particles selected from the group consisting of green rouge, silica, alumina, boron carbide, silicon carbide, steel and diamond distributed through the film.

10. An abrasive film consisting essentially of a polyamide-acid of a diamine and pyromellitic dianhydride having from 5% to 90% by weight of crystalline particles selected from the group consisting of green rouge, silica, alumina, boron carbide, silicon carbide, steel and diamond distributed through the film.

11. An abrasive film consisting essentially of a polyamide-acid of a dianhydride and 4,4'-diamino-diphenyl ether having from 5% to 90% by weight of crystalline particles selected from the group consisting of green rouge, silica, alumina, boron carbide, silicon carbide, steel and diamond distributed through the film.

12. An abrasive film consisting essentially of a polyimide film having from 5% to 90% by weight of crystalline particles selected from the group consisting of green rouge, silica, alumina, boron carbide, silicon carbide, steel and diamond distributed through the film.

13. An abrasive film consisting essentially of a polyimide of a diamine and pyromellitic dianhydride having from 5% to 90% by weight of crystalline particles selected from the group consisting of green rouge, silica, alumina, boron carbide, silicon carbide, steel and diamond distributed through the film.

14. An abrasive film consisting essentially of a polyimide of a dianhydride and 4,4'-diamino-diphenyl ether having from 5% to 90% by weight of crystalline particles selected from the group consisting of green rouge, silica, alumina, boron carbide, silicon carbide, steel and diamond distributed through the film.

References Cited by the Examiner
UNITED STATES PATENTS

| | | | |
|---|---|---|---|
| 2,899,288 | 8/1959 | Barclay | 51—298 |
| 3,168,387 | 2/1965 | Adams | 51—298 |
| 3,179,631 | 4/1965 | Endrey | 260—37 |
| 3,208,836 | 9/1965 | Biglin et al. | 51—298 |

MORRIS LIEBMAN, *Primary Examiner.*

ALEXANDER H. BRODMERKEL, *Examiner.*

D. J. ARNOLD, *Assistant Examiner.*